Nov. 11, 1969     W. H. MAIER ET AL     3,478,119
MANUFACTURE OF ETHYLBENZENE
Filed May 16, 1968
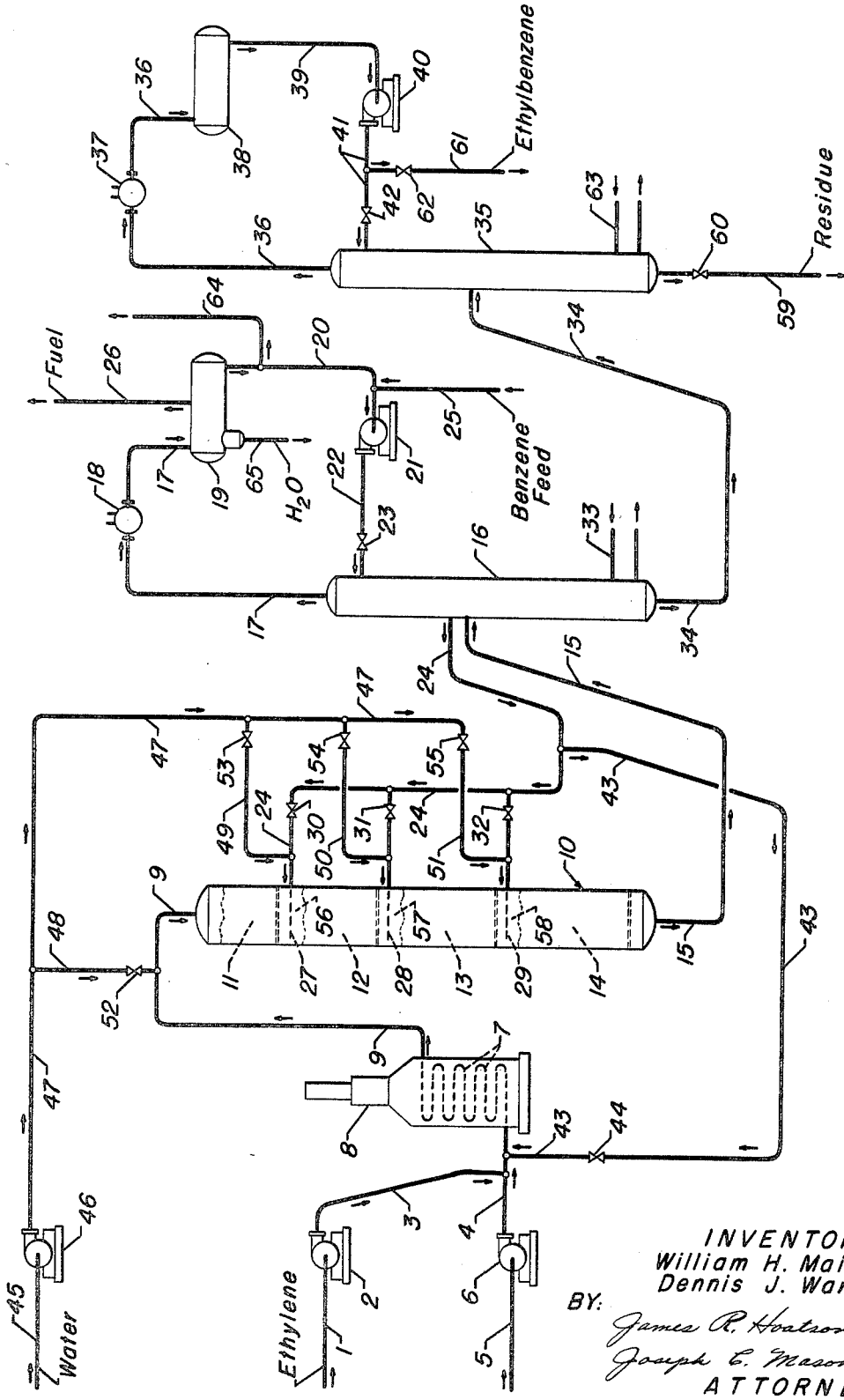
INVENTORS:
William H. Maier
Dennis J. Ward
BY:
James R. Hoatson, Jr.
Joseph C. Mason, Jr.
ATTORNEYS

United States Patent Office 3,478,119
Patented Nov. 11, 1969

3,478,119
MANUFACTURE OF ETHYLBENZENE
William H. Maier, Rosemont, and Dennis J. Ward, Lombard, Ill., assignors to Universal Oil Products Company, Des Plaines, Ill., a corporation of Delaware
Filed May 16, 1968. Ser. No. 729,637
Int. Cl. C07c 3/54
U.S. Cl. 260—671                                                          3 Claims

ABSTRACT OF THE DISCLOSURE

Method for producing ethylbenzene by alkylating substantially anhydrous benzene with high purity ethylene over a solid phosphoric acid catalyst. A water-containing benzene feed is first introduced into a fractionation zone with the ethylbenzene-containing reaction products and substantially anhydrous benzene is recovered therefrom and passed with ethylene to an alkylation zone. Water, as necessary to maintain catalyst activity, is introduced into the alkylation zone.

Background of the invention

This invention relates to the manufacture of ethylbenzene by the alkylation of benzene with high purity ethylene in the presence of solid phosphoric acid catalyst. This invention particularly relates to improvements in the alkylation reaction between high purity ethylene and substantially anhydrous benzene.

As is well known to those skilled in the art, ethylbenzene is a desirable article of commerce since it is the starting material for the production of styrene. Generally, styrene is produced through the steam dehydrogenation of ehylbenzene. Ethylbenzene does occur, to some extent, in petroleum fractions and may be obtained from such fractions through the technique of super-distillation. However, the demand for styrene in recent times has far surpassed the availability of naturally occurring ethylbenzene. Accordingly, the prior art has resorted more and more to the alkylation of benzene with ethylene using various types of catalyst, including solid phosphoric acid catalyst.

The prior art procedures for producing ethylbenzene from benzene and ethylene have generally included a catalytic reaction zone adapted to handling refinery off-gas streams containing ethylene, low purity (40%–80%) ethylene from pyrolysis units, and benzene which is of relatively high purity having, for the most part, been obtained from solvent extraction plants. The prior art processing scheme typically passes the effluent from the reaction zone into a high pressure separation zone wherein relatively light hydrocarbons, including unreacted ethane are removed. The gaseous stream from the high pressure separator is then usually scrubbed in an absorption zone for the recovery therein of the flashed hydrocarbons. The liquid stream from the separation zone is then passed into a series of fractionation columns for the recovery of unreacted benzene for recycle purposes and the recovery of ethylbenzene in high concentration and high purity. In short, therefore, the prior art schemes utilize a reaction zone, a separation zone, a vent gas absorber, a benzene column, a benzene dehydration column, and an ethylbenzene column, respectively. Associated with these various pieces of equipment are compression means for handling the unreacted ethane and other vent gases into the absorber system.

Therefore, since these major pieces of equipment associated with the prior art schemes are expensive, it would be desirable to simplify the alkylation reaction in order to eliminate as much as possible the capital investment costs and operating costs for the alkylation reaction unit. Accordingly, the present invention provides an improvement over the prior art schemes such that capital investment costs and operating costs have been significantly reduced.

Summary of the invention

It is an object of this invention to provide a method for producing alkylated aromatic hydrocarbons.

It is another object of this invention to provide a method for producing ethylbenzene by alkylating high purity ethylene with substantially anhydrous benzene over solid phosphoric acid catalyst in a facile and economical manner.

The practice of the present invention embodies a method for preparing ethylbenzene in high concentration which comprises the steps of: (a) admixing an ethylene feed stream comprising at least 95 mol percent ethylene with a hereinafter specified benzene stream; (b) passing said admixture into a catalytic reaction zone maintained under alkylation conditions including the presence of a plurality of fixed catalyst beds containing solid phosphoric acid catalyst; (c) withdrawing from said reaction zone an effluent stream containing normally gaseous hydrocarbons, ethylbenzene, and unreacted benzene; (d) passing said effluent directly into a fractionation zone maintained under distillation conditions; (e) introducing into the upper section of said fractionation zone a benzene feed stream containing water; (f) withdrawing from said fractionation zone an overhead fraction containing normally gaseous hydrocarbons and water, a side-cut fraction comprising substantially anhydrous benzene and a bottoms fraction comprising ethylbenzene; (g) passing at least a portion of said side-cut fraction into admixture with said ethylene feed stream as specified in step (a); and, (h) recovering ethylbenzene in high concentration from said bottoms fraction of step (f).

Another embodiment of the invention includes the method hereinabove wherein said fractionation zone of step (d) comprises a single distillation column.

In brief, therefore, the present invention includes the concept of using solid phosphoric acid catalyst to alkylate substantially anhydrous benzene with high purity ethylene and thereafter passing the total effluent from the reactor directly into a single fractionation column for the separation therein of the various desirable components contained in the effluent. The single fractionation column also is the point at which the benzene feed stream is introduced into the system. Thus, benzene in the preferred embodiment of this invention, does not pass directly into the reaction zone, but must first pass into the fractionation zone. It is immediately evident from the description presented thus far that the practice of the present invention has eliminated the prior art separation zone, fractionation zone, compression zone, and benzene drying column. Other benefits will be immediately evident from the detailed description of the present invention presented hereinbelow.

Detailed description of the invention

As previously mentioned, the present invention is directed solely to a reaction which utilizes solid phosphoric acid as the catalyst. Thus, solid phosphoric acid catalyst which may be utilized in the method of the present invention may be made by mixing an acid of phosphorous, such as ortho-, pyro-, or tetra-phosphoric acid with a finely divided, generally siliceous, solid carrier (such as diatomaceous earth, prepared forms of silica, activated clays, and the like) to form a wet paste. The paste is then calcined at temperatures, generally, below about 500° C. to produce a solid cake which is thereafter ground and sized to produce particles of useable mesh. If the calcination is carried out at temperatures above about 400° C., it may be desirable to rehydrate the catalyst granules at a temperature between about 200° C. and 350° C., typically, 260° C. to produce an acid composition corresponding to high alkylating activity. The catalyst preparation procedure may be varied by forming particles of the original paste by extrusion or by pelleting methods after which the formed particles are calcined and, if necessary, rehydrated. A solid phosphoric acid catalyst prepared from a major proportion by weight of a phosphoric acid having at least as large a water content as that of the pyro-acid and a minor proportion of the siliceous carrier, such as kieselguhr, is preferred for use in the present process.

The ethylene feed stream suitable for use in the practice of the present invention must be high purity. In other words, gaseous streams comprising at least 95 mol percent ethylene, preferably, 98 to 99 mol percent (or 100 mol percent) ethylene are satisfactory for use in the present invention. If the purity of the ethylene feed stream is significantly below 95 mol percent, the economical benefits obtained from the practice of the present invention are decreased significantly; although, the process will in many respects still be operable for the production of ethylbenzene.

The benzene which is used in the present invention should also be of relatively high purity, but this is not a stringent requirement. It is anticipated that the present invention will utilize benzene which is obtained from storage facilities and, therefore, will be saturated with water and will, in many cases, contain slugs of water admixed with the hydrocarbon phase. It will be recognized by those skilled in the art that if the benzene is of ultra-high purity and anhydrous, there will be little incentive to utilize the processing scheme of the present invention. However, it will be noted that the processing scheme of the present invention permits the utilization of relatively impure benzene and, therefore, relatively inexpensive benzene for the ultimate production of ethylbenzene in high concentration and high purity.

Since the solid phosphoric acid catalyst has been hydrated to produce an acid composition corresponding to high alkylating activity, it will be necessary to add water or water vapor, such as steam, to the charge material entering the reaction zone. This water or water vapor addition is necessary in order to substantially prevent loss of water from the catalyst and subsequent decrease in catalyst activity. The amount of water varies from about 0.001% to about 6% by volume of the organic material charged to the alkylation reaction zone.

The desired alkylation reaction is preferably performed in the presence of the above described catalyst and at a temperature from 32° F. to 707° F. The reaction is usually carried out at a pressure of from atmospheric to 200 atmospheres and, in some cases, a higher pressure. The pressure utilized is usually selected to maintain the benzene in substantially liquid phase. However, within the above mentioned temperature and pressure ranges it may not always be possible to maintain the ethylene in liquid phase. The hourly liquid space velocity of the liquid phase to the alkylation reaction zone may be varied over a relatively wide range, say, from about 0.1 to about 20. Operating under these conditions, the preferred practice of this invention will obtain essentially 100% conversion of the ethylene to the alkylated product of ethylbenzene. Therefore, the alkylation zone effluent should normally contain ethylbenzene, unreacted benzene, and small quantities of diluent, such as ethane.

The amount of benzene which is charged to the reaction zone relative to ethylene may be varied over a wide range; although, best results are obtained when the benzene to ethylene molar ratio is about 3:1 to about 20:1.

The invention may be more fully understood with reference to the appended drawing which is a schematic representation of apparatus for practicing one embodiment of the present invention.

Description of the drawing

The attached drawing illustrates diagrammatically an arrangement suitable for carrying out the method of the present invention. The drawing illustrates a plurality of catalyst beds, each containing solid phosphoric acid catalyst increasing in volume of direction of flow of the reactants and contained in a single vessel. This is the best mode contemplated by the inventor, but it is to be understood that the invention is not necessarily to be limited thereto.

Referring now to the drawing, an ethylene stream comprising 98 mol percent ethylene, with the remainder being ethane, is introduced into the inventive process through line 1 to pump or compressor 2 which discharges through line 3 leading to line 4 through which flows a hereinafter specified benzene reactant being introduced, preferably, from line 43 through valve 44. Alternatively, if a source of substantially anhydrous benzene is available, it may be incrementally added to the process from line 5 through pump 6.

The commingled streams pass through line 4 to heater 8 containing heat coils 7 passing from the heater through line 9 in to the top of reactor 10. The reactants pass downwardly through reactor 10 thereby passing through a plurality of catalyst beds 11, 12, 13, and 14. In our preferred manner of operation, each catalyst bed is of larger volume than those preceding it; although, there is no necessarily fixed relationship between the sizes of the respective beds. Where desired, a larger number of catalyst beds, for example, up to as many as six or more may be employed.

The several beds or catalyst may be supported in the reaction chamber in any convenient manner, such as by means of supporting grids resting upon lugs welded to the inside wall of the reactor. Substantial open spaces are provided between the several catalyst beds indicated as 56, 57 and 58. The volumes of these void spaces being sufficient to permit the introduction of water and/or a hereinafter specified quenching medium and to provide space for thorough mixing of either or both of these added materials to the reactant stream before the latter enters the next succeeding catalyst bed.

As an example of a commercial scale operation, the ethylene feed may be introduced at 95° F., 100 p.s.i.g., and at a rate of about 84 mols per hour. The benzene is introduced into admixture with the ethylene stream at a temperature of 196° F. and a rate of about 916 mols per hour. The commingled feed stream at a rate of 1000 mols per hour and a pressure of about 950 p.s.i.g. is passed through the heater and into the top of the reactor at 500° F. and a pressure of 910 p.s.i.g.

The reaction product is withdrawn from reactor 10 through line 15 at a temperature of 550° F., a pressure of 900 p.s.i.g., and a rate of about 926 mols per hour. This effluent stream is passed directly to fractionating column 16 without any intervening separation thereof of hydrocarbon constituents. As used herein, the term "passed directly," or words of similar import, is intended to exclude any separation zone which performs a separation between hydrocarbon components. It is anticipated, however, that the effluent stream may pass through heat exchange means, for example, to provide preheat to the incoming feed stream and to pass through an acid scrubber for the removal of acidic components from the effluent or to a filter to remove particles of catalyst prior to introduction into fractionating column 16.

Fractionating column 16 is preferably a single column wherein the reaction zone effluent is introduced at an intermediate location at a temperature of about 221° F. and a pressure of about 8 p.s.i.g. It is a requirement of the present invention that substantially all of the benzene feed be introduced into the upper section of the column preferably at a location above the top tray of the column. Suitable distillation conditions are maintained in column 16 to produce an overhead fraction comprising benzene, water, and a small amount of normally gaseous hydrocarbons which are removed via line 17 at a temperature of 188° F. and a pressure of 4 p.s.i.g. This overhead fraction is passed through condenser 18 into receiver vessel 19.

In receiver vessel 19, the separated water is withdrawn via line 65 and, generally, sent to the refinery filter system. A vent gas is withdrawn via line 26 and sent, preferably, to fuel. By operating in accordance with the teachings presented herein there should be no more than about 20 mol percent benzene in the vent gases from line 26. In the illustrative example presented herein, the amount of vent gas material in line 26 will be about 3 mols per hour of which benzene will amount to less than 0.6 mol per hour. Suitable separation conditions maintained in receiving vessel 19 include a temperature of 100° F. and atmospheric pressure.

The remaining hydrocarbon stream comprising benzene, contaminating quantities of naphthenes, such as cyclohexane, is withdrawn via line 20 and admixed with the incoming water saturated, benzene feed from line 25. A drag stream of benzene is withdrawn from the process via line 64 in order to maintain the contaminating portion of the naphthenes at a suitably low level.

Illustrative of the practice of the present invention, the material in line 20 will comprise approximately 944 mols per hour and is admixed with 83 mols per hour of benzene from line 25. This admixture passed through pump 21, line 22, and control valve 23 into the upper portion of column 16, as previously indicated.

The distillation conditions maintained in column 16 are sufficient so that a substantially anhydrous liquid benzene fraction may be withdrawn as a side-cut stream at a locus intermediate between the reactor effluent locus and the feed benzene locus. Typically, the side-cut withdrawal fraction will be at 196° F., 6 p.s.i.g., and in accordance with the present example at a rate of about 924 mols per hour. This side-cut fraction is then passed via line 24 and line 43, control valve 44 into admixture with the incoming ethylene feed stream, as previously described.

When it is desired to recycle benzene to the reactor as quenching medium, a further portion of the material in line 24 may be introduced in liquid state into the reactor at any or all of the points in between the several catalyst beds by way of lines 27, 28, and 29 which join line 24, the respective amounts of quenching benzene employed being regulated by valves 30, 31, and 32. Those portions of lines 27, 28, and 29 which are within reactor 10 will be provided with suitable means for sufficiently distributing the benzene into the reactant stream. For illustrative purposes, the total amount of benzene quench may be 8 mols per hour at a temperature of 196° F.

Heat for the distillation in column 16 is furnished through heating coil 33. Reaction zone product comprising ethylbenzene and polyalkylbenzene are withdrawn from the bottom of column 16 and passed through line 34 into column 35 which serves to separate an overhead stream of high purity ethylbenzene and a bottom stream of residual materials comprising polyalkylbenzene.

Ethylbenzene is withdrawn through overhead line 36 and condenser 37 to receiver 38 from which pump 40 draws ethylenbenzene through line 39, discharging a portion thereof as reflux to the column through line 41 and valve 42, and the remaining portion as product material which is removed from the system via line 61 and control valve 62.

Heat for distillation purposes in column 35 may be introduced via heat coil 63. The residue material comprising polyalkylbenzene is withdrawn from the bottom of the column 35 via line 59 and control valve 60.

Suitable operating conditions maintained in column 35 include an overhead temperature of about 297° F. and a pressure of 5 p.s.i.g., thereby permitting a total withdrawal of the overhead fraction at a rate of 125 mols per hour. The reflur in line 22 is introduced at a rate of 51 mols per hour, a temperature of 180° F., and substantially atmospheric pressure. The ethylbenzene is withdrawn in high purity and high concentration via line 61 at a temperature of 100° F. and a rate of 74 mols per hour. The bottom of column 35 is maintained at a temperature of 411° F., a pressure of 10 p.s.i.g., thereby permitting the withdrawal of about 4 mols per hour of residue material via line 59.

Water to be introduced into the system for maintenance of the prescribed water concentration in the reactant stream in accordance with the invention is supplied via line 45 and pump 46 to line 47 which in turn leads to lines 48, 49, 50, and 51. Line 48 supplies water to the reactant stream initially entering reactor 10, the amount being regulated by valve 52. This initial water introduction can be achieved by any of the various alternative methods within the contemplation of the invention, but not shown in the drawing. For example, instead of injecting the water into line 9 by way of line 48, it could as well be injected into either line 1 or for that matter, through line 5 in the event substantially anhydrous benzene was not available for introduction into the system as feedstock.

Line 49 supplies water to the space 56 between catalyst beds 11 and 12 by water of line 27, the amount introduced being regulated by valve 53. Similarly, lines 50 and 51 which connect with lines 28 and 29, permits the supplying of water to the reactants in spaces 57 and 58, the respective amounts being regulated by valves 54 and 55. If desired, the inlet piping and distribution means for the water introduction may be maintained separate and independent from the system used for supplying quenching medium to the reactor. In general, it is preferred that the water be introduced in vaporous state into the reactor and any necessary heat for this purpose can be accomplished by any convenient means not shown in the drawing.

The invention claimed:
1. Method for preparing ethylbenzene in high concentration which comprises the steps of:
 (a) admixing an ethylene feed stream comprising at least 95 mol percent ethylene with a hereinafter specified benzene stream;
 (b) passing said admixture into a catalytic reaction zone maintained under alkylation conditions including the presence of a plurality of fixed catalyst beds containing solid phosphoric acid catalyst;
 (c) withdrawing from said reaction zone an effluent stream containing normally gaseous hydrocarbons, ethylbenzene, and unreacted benzene;
 (d) passing said effluent directly into a fractionation zone maintained under distillation conditions;
 (e) introducing into the upper section of said fractionation zone a benzene feed stream containing water;
 (f) withdrawing from said fractionation zone an overhead fraction containing normally gaseous hydrocarbons and water, a side-cut fraction comprising substantially anhydrous benzene, and a bottoms fraction comprising ethylbenzene;
 (g) passing at least a portion of said side-cut fraction into admixture with said ethylene feed stream as specified in step (a); and, (h) recovering ethylbenzene in high concentration from said bottoms fraction of step (f).

2. Method according to claim 1 wherein said fractionation zone of step (d) comprises a single distillation column.

3. Method according to claim 2 wherein said overhead fraction contains less than 20 mol percent benzene.

References Cited
UNITED STATES PATENTS

| | | | |
|---|---|---|---|
| 2,945,072 | 7/1960 | Joris | 260—671 |
| 3,201,486 | 8/1965 | Bielawski et al. | 260—671 |

DELBERT E. GANTZ, Primary Examiner

CURTIS R. DAVIS, Assistant Examiner